United States Patent
Purves

(10) Patent No.: US 10,438,195 B2
(45) Date of Patent: Oct. 8, 2019

(54) TOKEN CREATION AND PROVISIONING

(71) Applicant: Thomas Purves, San Francsico, CA (US)

(72) Inventor: Thomas Purves, San Francsico, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 336 days.

(21) Appl. No.: 15/337,921

(22) Filed: Oct. 28, 2016

(65) Prior Publication Data

US 2018/0121917 A1  May 3, 2018

(51) Int. Cl.
*G06Q 20/36* (2012.01)
*G06Q 20/40* (2012.01)
*G06Q 20/12* (2012.01)

(52) U.S. Cl.
CPC ......... *G06Q 20/3672* (2013.01); *G06Q 20/12* (2013.01); *G06Q 20/363* (2013.01); *G06Q 20/3674* (2013.01); *G06Q 20/401* (2013.01); *G06Q 20/4014* (2013.01)

(58) Field of Classification Search
CPC ............. G06Q 20/3674; G06Q 20/401; G06Q 20/3672
USPC .......................................................... 705/64
See application file for complete search history.

(56) References Cited

U.S. PATENT DOCUMENTS

| | | | |
|---|---|---|---|
| 7,103,575 B1* | 9/2006 | Linehan | G06Q 20/12 235/379 |
| 2004/0260607 A1* | 12/2004 | Robbins | G06Q 20/20 705/14.32 |
| 2014/0344153 A1* | 11/2014 | Raj | G06Q 20/3821 705/44 |
| 2015/0019944 A1 | 1/2015 | Kalgi | |
| 2015/0046276 A1 | 2/2015 | Artman | |
| 2015/0112870 A1* | 4/2015 | Nagasundaram | G06Q 20/3821 705/67 |
| 2015/0199689 A1* | 7/2015 | Kumnick | G06Q 20/3674 705/67 |
| 2015/0221149 A1* | 8/2015 | Main | G07C 9/00119 340/5.61 |
| 2015/0339663 A1* | 11/2015 | Lopreiato | G06Q 20/3278 705/67 |
| 2015/0339667 A1 | 11/2015 | Dua | |
| 2016/0092872 A1* | 3/2016 | Prakash | G06Q 20/3829 705/65 |

(Continued)

OTHER PUBLICATIONS

"EMV® Payment Tokenisation Specification—Technical Framework, Version 1.0" which was published Mar. 10, 2014 by EMVco, an industry consortium.*

(Continued)

*Primary Examiner* — Jamie R Kucab
(74) *Attorney, Agent, or Firm* — Loeb & Loeb LLP

(57) ABSTRACT

Merchants convert consumer account data to a common tokenized format by requesting wallet accounts for consumers not currently enrolled at a wallet platform. The tokenized card numbers replace merchant-stored personal account numbers (PAN) and allow merchants to use a common communication format for processing all transactions. When a consumer creates a new wallet account, existing 'shadow' accounts are added to the new wallet account.

17 Claims, 5 Drawing Sheets

(56) References Cited

U.S. PATENT DOCUMENTS

| | | | |
|---|---|---|---|
| 2016/0162882 A1* | 6/2016 | McClung, III | G06Q 20/02 705/41 |
| 2016/0189123 A1* | 6/2016 | Lucia Specogna | G06Q 20/385 705/43 |
| 2016/0232527 A1* | 8/2016 | Patterson | G06Q 20/405 |
| 2016/0267455 A1* | 9/2016 | Rewis | G06Q 20/204 |
| 2016/0275502 A1* | 9/2016 | Amancherla | G06Q 20/401 |

OTHER PUBLICATIONS

ISO 13491-1, Third Edition, dated Mar. 15, 2016,"Financial services—Secure cryptographic devices (retail)".*
International Search Report and Written Opinion for PCT/US17/057824 dated Dec. 28, 2017, 13 pages.

* cited by examiner

TOKEN CREATION AND PROVISIONING

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Information that merchants store about consumers varies based on the time and method by which the information was obtained. That is, consumer information received in-store or over the phone can be different than consumer information received through an online transaction or when using a wallet service. This variation in consumer information causes merchants to maintain different communication interfaces based on the data type even when communicating with the same entity, such as an acquirer or issuer.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a merchant's consumer data including personal account numbers and related information is converted to a token format at a wallet platform and a "guest" wallet account is created. The wallet platform returns an enriched payload to the merchant including tokenized account information. The merchant may then delete the consumer's personal account information in favor of the more secure tokenized information. Further, the merchant may communicate using a single interface as all consumer data is stored in a common format. When a consumer creates a wallet account directly on the wallet platform, the guest wallet account is automatically incorporated into the consumer wallet.

The figures depict various embodiments for purposes of illustration only. One skilled in the art may readily recognize from the following discussion that alternative embodiments of the structures and methods illustrated herein may be employed without departing from the principles described herein.

DETAILED DESCRIPTION

Figure 1:
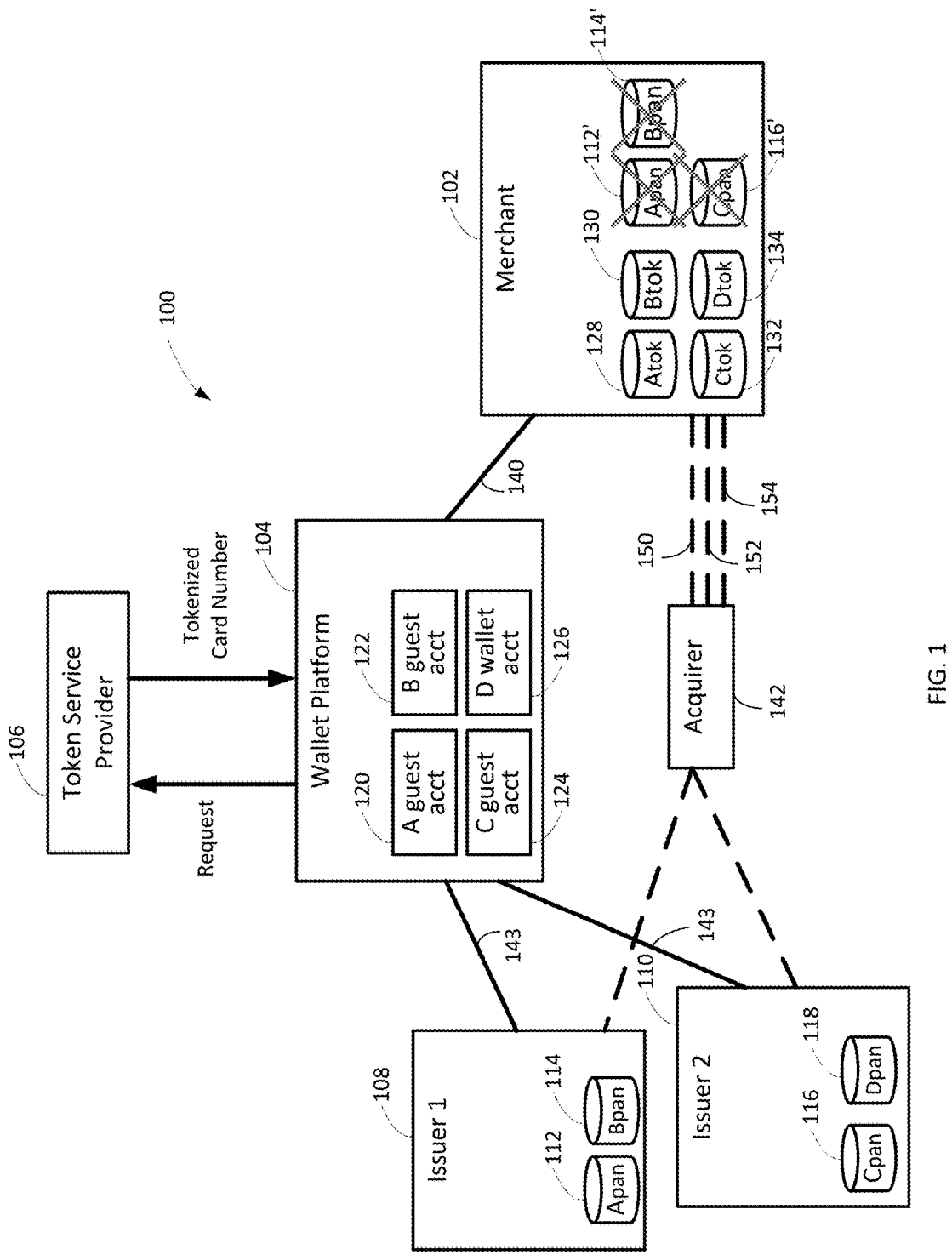
FIG. 1 illustrates a block diagram of system elements for token creation and provisioning in accordance with the current disclosure.

FIG. 1 generally illustrates one embodiment of a system 100 for token creation and provisioning. The system may include, in various embodiments, a merchant 102, a wallet platform 104, a token service provider 106, and one or more issuers 108, 110. In other embodiments, system 100 may include only the wallet platform 104 with the merchant 102, token service provider 106, and issuers 108, 110, being in communication with, but not part of, the system 100.

In the illustrated embodiment, the issuer 108 has an account A 112 and an account B 114 while the issuer 110 has an account C 116 and an account D 118. For the sake of illustration, these accounts will be referred to in this disclosure as credit card accounts but these teachings apply to other kinds of accounts that rely on personally identifiable information including but not limited to debit cards, gift cards, loyalty programs, brokerage accounts, or retirement accounts. Each of the accounts 112, 114, 116, 118 includes a personal account number (PAN) which, in this embodiment, may be the credit card number embossed on the face of the consumer's credit card.

The merchant 102 may store consumer's respective account information at the merchant site for use in recurring transactions or for the convenience of its consumer when making routine purchases, often referred to as card-on-file transactions. In FIG. 1 this information is depicted with consumer account information Apan 112', Bpan 114', and Cpan 116'. The merchant's information for account D may be stored a token-based format Dtok 134 that may include, among other things, a tokenized representation of the PAN and a CallID used to identify transactions between the merchant 102 and the wallet platform 104. The token 134 may be issued on behalf of a consumer by the wallet platform 104 in response to a request from a consumer while registering at the wallet platform 104. In a subsequent transaction in which the consumer uses his or her wallet account 126 at the merchant 102, the merchant 102 may provide previously stored token 134 (or CallID) to the wallet platform 104 in order to ultimately complete payment from D's credit card account 118.

The token 134 provides additional security to both the consumer and the merchant 102 in the event of a security breach because the token has limited value outside the merchant 102 due, among other things, to additional validation of transactions performed at the wallet platform 104 and the limited scope of the token 134 to transactions only between the merchant 102 using the wallet platform 104. For at least this reason, there is a value to the merchant when storing tokens instead of PANs.

The storage and use of both tokens 134 and accounts with PANs 112', 114', 116' has another undesirable side-effect for the merchant 102. As shown in FIG. 1, the merchant 102 may communicate with the wallet platform 104 using a token-oriented application program interface (API) 140. However, the merchant 102 may be required to also support various card-specific interfaces such as API 141 when communicating with an acquirer 142, different issuers 108, 110 or even in the case where the merchant 102 is communicating with one acquirer 142 using different protocols based on a source of the transaction such as over-the-phone vs. over-the-web. The effect, then, is that the merchant 102 must maintain multiple interfaces based on the nature of the payment vehicle, the type of credit card, or the manner in which the credit card data was acquired.

Merchant Bulk Tokenization Use Case

Figure 2:
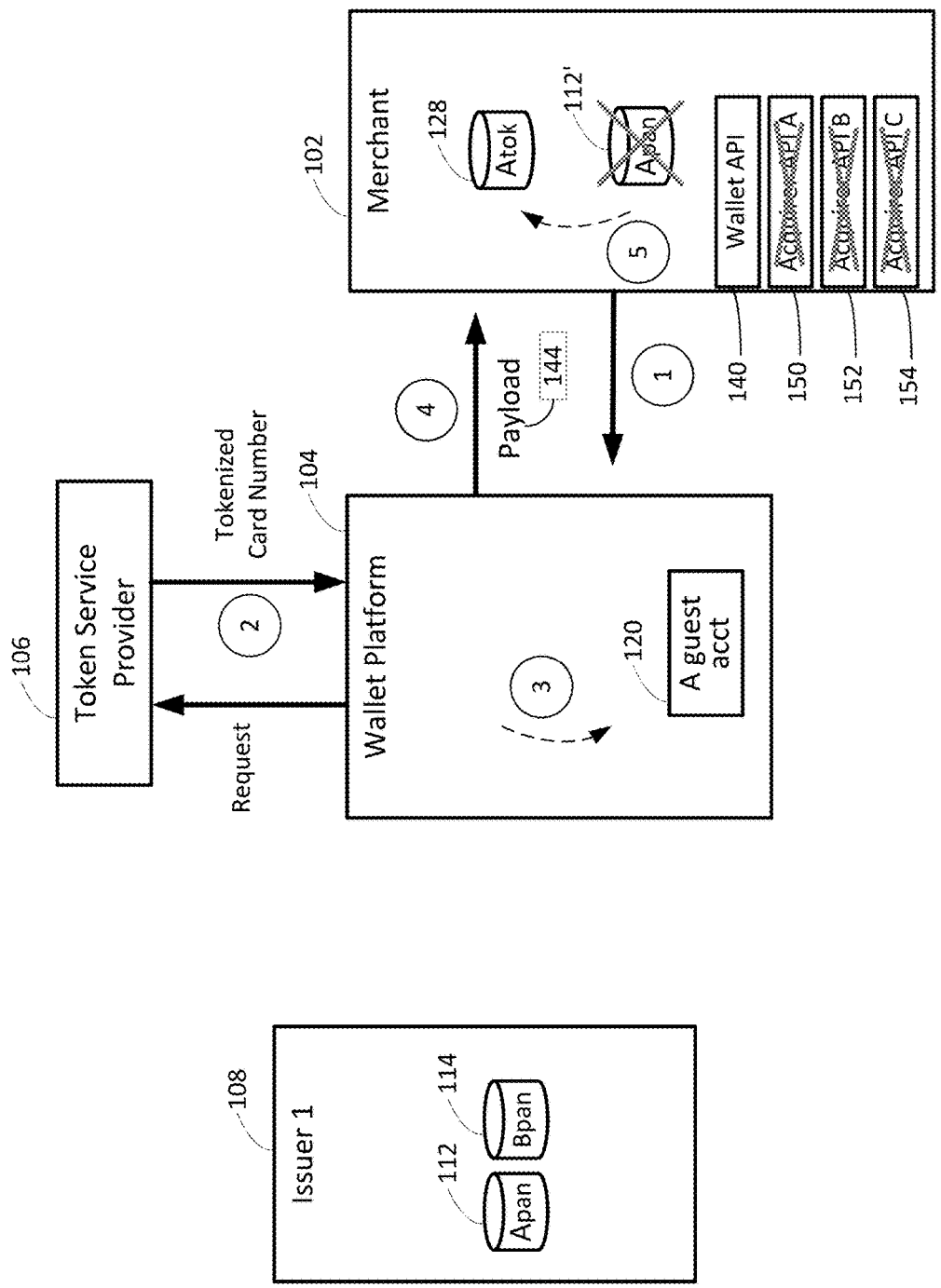
FIG. 2 is a block diagram illustrating active elements in a merchant bulk tokenization.

In order to address both the security concerns and the issues with maintaining multiple APIs, the wallet platform 104 may expose an API 140 that allows the merchant 102 to request conversion of consumer accounts with PANs 112', 114', and 116' to "guest" or "shadow" wallet accounts 120, 122, 124. Also with reference to FIG. 2, the merchant 102 may provide ("1"), along with the PAN, additional information that the merchant 102 has on file for respective consumers, such as the consumer ship-to address, email, etc. The wallet platform 104 requests and receives ("2") a tokenized card number from a token service provider 106 and uses this information to generate ("3") wallet platform guest accounts 120, 122, 124.

In theory, a merchant 102 could directly request a tokenized card number from the token service provider 106, but there are practical considerations that prevent this. In order for the merchant 102 to make this request, the merchant 102 would have to become a "token requestor." However, when the standards body for token services (EMV Co) instituted the architecture for token services, the number of token requestors was limited by the number space assigned for token requestors. While the number is relatively large, the number space is not large enough for the hundreds of thousands or millions of merchants worldwide to be certified as token requestors. Nor would every merchant 102 necessarily want to go through the vetting process and incorporate the security and operations policies associated with becoming a token requestor.

Returning to FIGS. 1 and 2, the wallet platform 104, having received the tokenized card number from the token service provider 106, may then return ("4") an enhanced payload 144 to the merchant 102 that may contain, in some embodiments, a CallID, the tokenized card number, a payment account reference (PAR), and card metadata. The card metadata may include card artwork for display to the consumer when making a purchase, loyalty data, or other linked offers associated with the card. The CallID is an extensible object that may be restricted to a particular merchant and consumer and may also have expirations from single-use to months or more. The merchant 102 may then generate local token-based accounts 128, 130, 132 followed by safely disposing ("5") of the PAN-based consumer information 112', 114', and 116'. The merchant's liability in the event of a data breach is significantly reduced because the merchant 102 no longer has active card numbers, but rather CallID-based account references and/or tokenized card-based account references.

At this point, the merchant 102 now has guest wallet accounts that the merchant 102 may use on behalf of the consumers when processing a transaction for the consumer. For example, if a consumer "A" buys a product at a website of the merchant 102 and the consumer chooses to use card on file ending in "1234," the merchant 102 may process the transaction using a tokenized card number (or CallID) from the enhanced account data 128 corresponding to the originally-stored card ending in "1234." The consumer does not necessarily know that the guest account 120 exists. The merchant 102, however, now that all its consumer payment information is in the tokenized format may now standardize its interface code to use API 140 (or equivalent) for every transaction.

Issuer Push Tokenization

Figure 3:
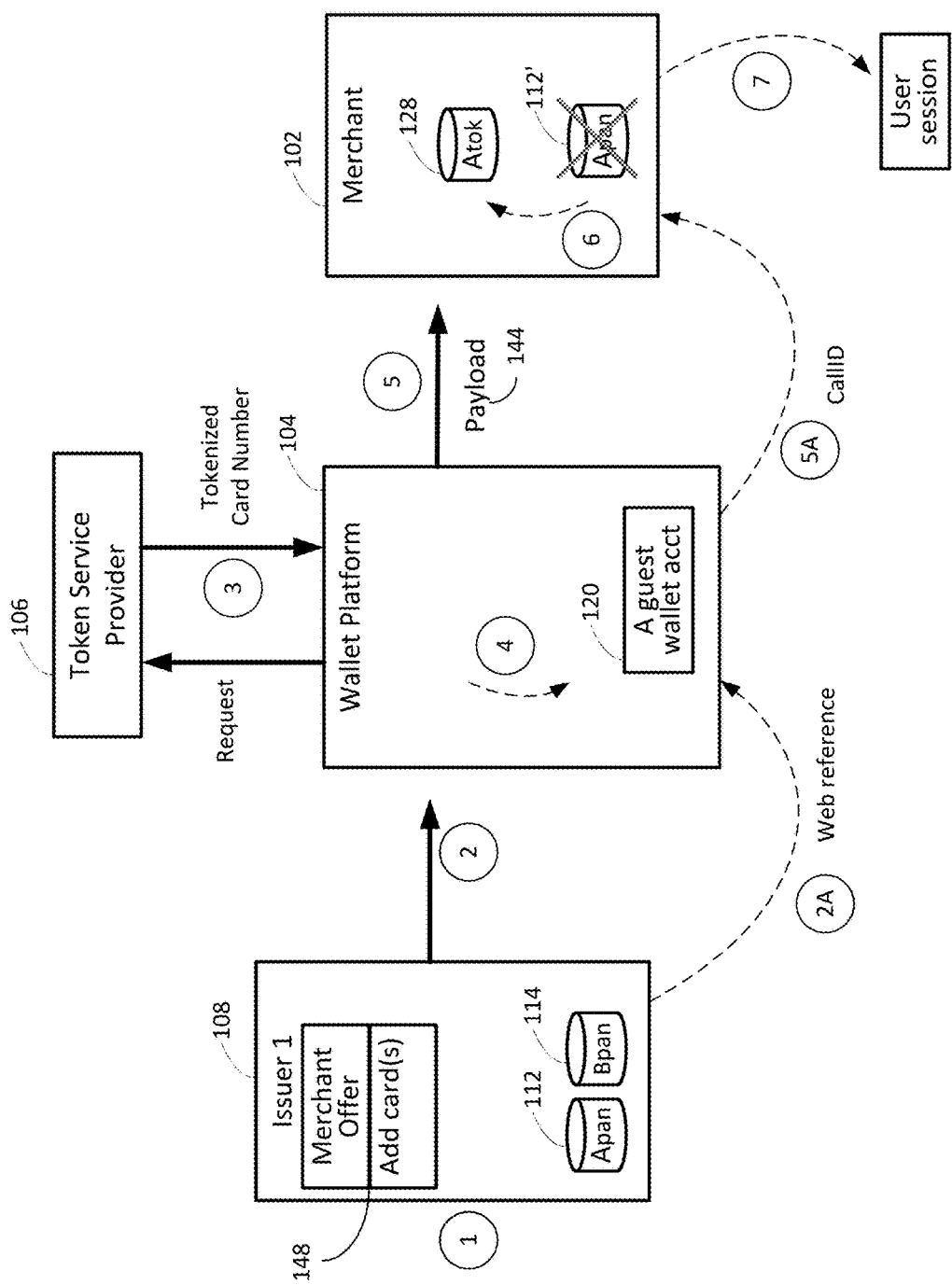
FIG. 3 is a block diagram illustrating active elements in an issuer push tokenization.

In another embodiment, an issuer 108 may act in concert with a merchant 102 to present an offer for a consumer to create a shadow or guest wallet account 120. In this scenario, illustrated in FIG. 3, the consumer may be online with the issuer 108 in the course of normal business. For example, the consumer may be online with an issuer to check a current balance or make a payment. The issuer 108 may want to simplify interactions with the merchant 102 by enabling use of the common API 140 but does not want to necessarily force the consumer to register for a general purpose wallet.

Similarly, the merchant 102 may desire to move to the common interaction format for transaction processing and either does not want to perform the bulk tokenization discussed above or has another reason for wanting at least some level of participation by the consumer. Also, as with the issuer 108, the merchant 102 may not want to force the consumer to select a particular wallet platform and enroll in a general purpose wallet. In this case, the issuer 108 may present ("1") an offer 148 to the consumer to allow conversion of his or her credit card account held at the merchant 102 to a token-based account. The offer, ultimately made by the merchant 102, may even include an incentive such as a shopping discount or cash-back award.

When the consumer approves the offer, the issuer 108 may pass ("2") the consumer/cardholder account information 112, or a relevant portion thereof, to the wallet platform 104 in an issuer-standard format using, for example, API 143. The issuer 108 may also pass ("2A") web session information to the wallet platform 104 for later use. The wallet platform 104 may decrypt and parse the payload from the issuer 108 and communicate ("3") with the token service provider 106 to generate a tokenized card number. The wallet platform 104 may generate ("4") a limited-use guest account 120 including a tokenized card number and/or merchant CallID. The wallet platform 104 may prepare a payload 144 including the CallID, the tokenized card, and other account information as needed and available. The payload 144 may be encrypted with the merchant's pre-established secret key.

The wallet platform 104 redirects ("5A") the consumer to the merchant 102 by web-redirect and post message or other mechanism and passes the CallID as a parameter. Using the CallID, the merchant 102 may call a standard wallet API to retrieve ("5") the encrypted account payload from the wallet platform 104 and decrypt the payload using the merchant's secret key. Using the payload information, the merchant 102 may update the consumer account with the CallID, tokenized card information, etc. and subsequently remove ("6") the PAN and related information 112'. Once the remaining account details are extracted, the merchant 102 may interact ("7") with the consumer via a web session, including redeeming any original offer 148 made to the consumer at the issuer site The consumer may, through either of the processes described above, have many guest accounts generated on his or her behalf over time. Multiple merchants may convert local PAN data 112' to the tokenized format, creating separate individual guest wallets for each merchant at the wallet platform 104. Multiple issuers 108, 110, may push-activate guest wallet accounts on behalf of the same or different merchants.

These guest accounts 120, 122, 124, may be accessible to the consumer, based on his or her access point. For example, the wallet platform 104 may expose an API that allows the issuer 108 to request information for all accounts associated with a particular personal account number (PAN). When the consumer associated with that PAN is on a website of the issuer 108, the consumer may see information about those guest or shadow accounts. In an embodiment, the consumer may also be able to retrieve information through the issuer 108 about a standard wallet account that was explicitly set up by the consumer.

A consumer interacting on the website of merchant 102 may be able to view information about the tokenized account 128. For example, the consumer may be able to access special offers and loyalty rewards, or update personal information related to the account via the merchant 102.

As discussed more below, should the consumer access the wallet platform 104, for example, after creating a wallet account, the consumer may gain visibility to all his or her wallet accounts whether created by the consumer or on his or her behalf by a merchant 102 or issuer 108. These accounts would include accounts for all issuers, accounts for all merchants, and user-initiated accounts held by the consumer at the wallet platform.

Consumer Initiated Account Merging

The consumer may at some point create a wallet account 126 on the wallet platform 104. At this point, the wallet platform 104, with its knowledge of the separate guest accounts that may exist tied either to the consumer's identity or PAN number or numbers may then add the information from the guest accounts that were created on behalf of the consumer to the newly-created wallet account 126, after a level of identity verification. That is, the merchant-branded cards and issuer-branded cards that are stored as guest accounts at the wallet platform 104 may then be transferred to the consumer's regular account. After this conversion the consumer may then view and manage all accounts without regard to whether they were established directly by the consumer or on behalf of the consumer by another party. Where the 'guest' or shadow accounts are intended to be dedicated for use only with the merchant that established the account, in an embodiment, after transfer of the guest wallet account data to the full consumer wallet, the credit cards (or other types of financial instruments) associated with the guest wallet accounts may be used in any setting supported by the wallet platform 104, for example, at another merchant.

Figure 4:
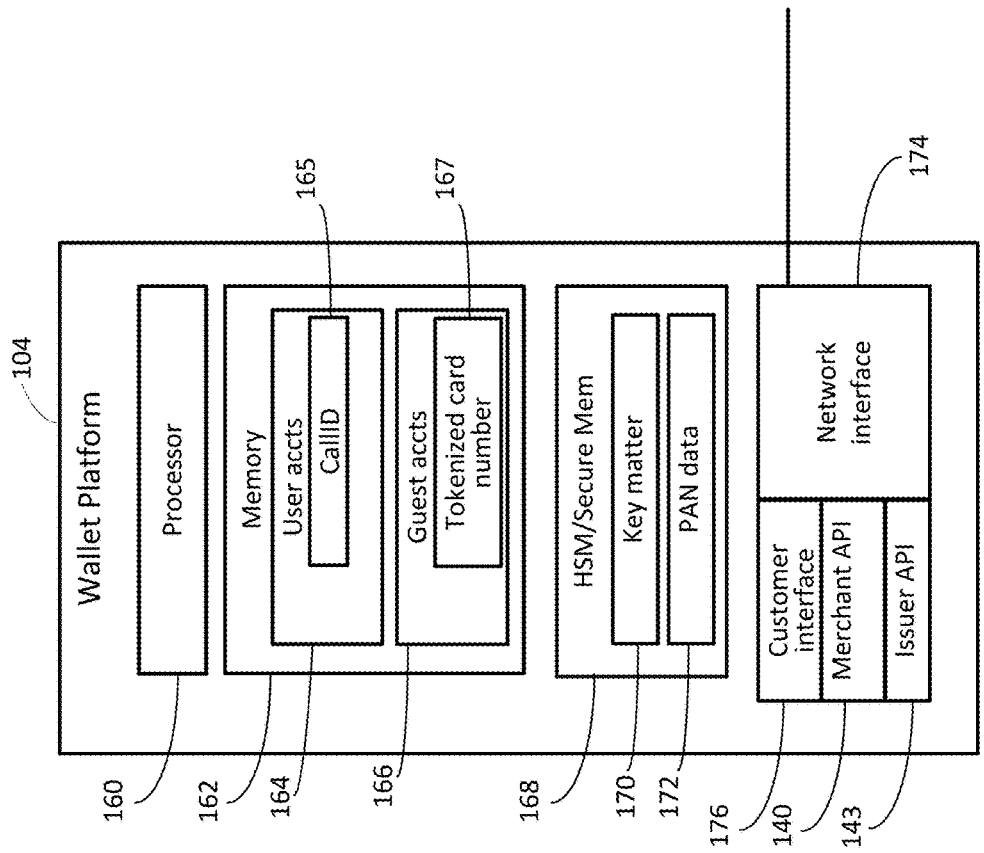
FIG. 4 is a block diagram of components of a wallet platform in accordance with the current disclosure.

FIG. 4 is a simplified block diagram of one embodiment of a wallet platform 104. The wallet platform 104 may include a processor 160, and memory 162. The memory 162 may be a physical memory including a variety of types of physical volatile and non-volatile memory but it may not include carrier wave or propagated media. The memory 162 may include both consumer accounts 164 and guest accounts 166, where a consumer account is one that is explicitly requested by a consumer and contains information entered by the consumer. A guest account 166 may be one that is not initiated by a consumer, but rather one that is requested by another party on behalf of a named or an anonymous consumer. Both guest and consumer accounts may include a CallID 165, a tokenized card number 167, or both.

A hardware security module (HSM) 168 may be used to store keys for encryption, decryption, and signing, including shared secret keys with one or more merchants 102, issuers 108, 110, and token service provider 106. The HSM 168 may be capable of storing and generating keys, both symmetric and asymmetric keys. The HSM 168 may also have hardware and software for executing various cryptographic algorithms used for signing, signature verification, encryption, and decryption with known algorithms including, but not limited to, DES, TDES, AES, elliptic curve, and RSA.

In an embodiment, the HSM 168 may encrypt consumer accounts 164 and guest accounts 166 so that even if they are stored in unprotected memory 162, the data is encrypted while stored. The keys used for the local encryption of data may be generated and used locally so that copying the data for accounts 164, 166 off-device will have no value because the keys stored in the HSM 168 would be inaccessible. In another embodiment, the HSM 168 may use a derivation process for the local encryption keys so that the consumer accounts may be restored in the event of a disaster. The HSM 168 may be a special hardware element that includes tamper resistance, tamper detection, temperature sensors, light sensors, etc., to deter and detect efforts to tamper with the HSM 168 for the purpose of extracting keys from the device.

A network interface 174 may be used for communications with external entities including, but not limited to, the merchant 102, the token service provider 106, and the issuers 108, 110. Associated with the network interface 174 are various interfaces that may be presented based on the nature of a current session. In one instance, a consumer session may be connected to a code supporting a consumer interface 176, such as a web page, that allows a consumer to create, manage, and retire a wallet account 126 for use in, among other things, purchase transactions. Sessions with merchants, such as merchant 102 may be supported by a merchant API 140. The merchant API 140 may expose calls that allow the merchant to request guest accounts as discussed above. The merchant API 140 may also support various transaction and maintenance calls including transaction intent and lifecycle updates such as cardholder address changes or card expiration.

Figure 5:
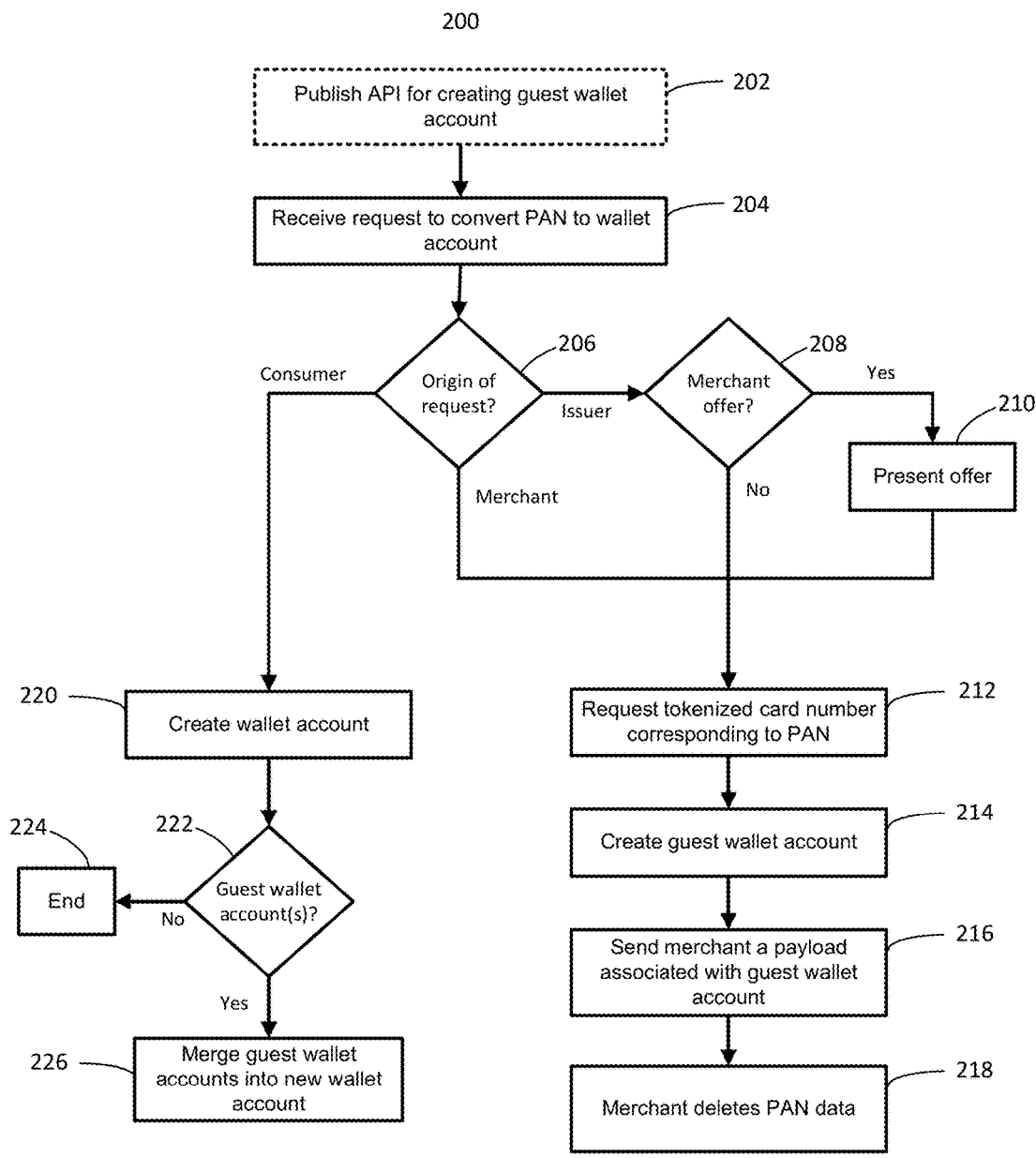
FIG. 5 is a flowchart of a method of token creation and provisioning.

FIG. 5 is a flowchart of a generalized method 200 of token creation and provisioning in accordance with the current disclosure. Optionally, at block 202, a wallet platform 104 may expose one or more an application program interfaces (APIs) 140, 143 for use in creating guest (shadow) wallet accounts 120, 122, 124. The APIs 140, 143 may be used by a merchant 102 or issuer 108 to request creation of guest wallet accounts, to request information about guest wallet accounts, to send transaction information including transaction intent information, or to send and receive lifecycle data related to the guest wallet accounts.

At block 204, the wallet platform 104 may receive a request to convert a consumer's personal account number (PAN) 112', e.g., card-on-file data, to a tokenized card number with associated account information as available. The origin of the request may be determined at block 206, for example, by way of the channel by which the request was received. In various embodiments, the request may be received from the issuer 108 via API 143, from the merchant 102 via API 140, or via a direct consumer interaction via the web.

If the request is from the issuer 108, the "Issuer" branch may be taken from block 206 to block 208, where a decision is made if a merchant offer is involved in the process. If so, the "Yes" branch from block 208 is taken to block 210 and the offer 148 may be presented to the consumer and execution continued at block 212. If, at block 208, no merchant offer is involved the "No" branch may be taken from block 208 to block 212. Returning to block 206, if the origin of the request is from the merchant 102 execution continues at block 212.

As may be seen, the general steps for creating the guest wallet account 120 are the same or similar for each path by which execution arrives at block 212. There, the wallet platform 104 may receive the request to create a guest wallet account 120 for a particular consumer, generally based on a PAN known to the requester, whether it the issuer 108 or the merchant 102. As discussed above, the wallet platform 104 request the tokenized card number from the token service provider number 106 and creates the guest wallet account 120 by adding data to the tokenized card number such as consumer information received from the requester and/or a CallID generated at the wallet platform 104.

At block 216, a payload is sent to the merchant 102 from the wallet platform 104 that contains at least the CallID and may also include the tokenized card number. Also as discussed above, once the request is received via the issuer 108 a web redirect session may also be passed from the wallet platform 104 to the merchant 102. At block 218, the merchant 102 may use the CallID and any other information received from the wallet platform 104 related to the guest wallet account 120 to update the consumer account 112' to the token-based account 128, in particular, removing the PAN for consumer A from its local records.

Returning to block 206, if the request is received from a consumer during an account creation process, execution may continue at block 220. The wallet platform 104 may create the wallet account in a conventional manner. At block 222, the wallet platform 104 may search for guest wallet accounts associated with the same consumer either via personally identifiable information or a PAN associated with the same financial instrument. If no such guest wallet accounts exist the process may end at block 224. If guest wallet accounts do exist, execution may continue at block 226 where the guest wallet accounts are merged into the consumer's new wallet account.

The ability to address the technical problem of converting card-on-file databases of personal information, such as financial instrument personal account numbers using a technical solution in the form of a tokenized format benefits both merchants, issuers, and consumers. A consumer's information is protected from compromise by data breaches at locations that may not be as secure as others. For example, the token service provider 106, where PAN information is stored in the above-described process, has no consumer-facing access and may maintain a significantly higher security profile than a large on-line retailer with supplier, consumer, and employee-facing access points.

An issuer 108 benefits from standardized access via the wallet platform 104 and also benefits from the reduction in risk associated with stolen PAN data. Lastly, the merchant also benefits both from the protection of consumer account information as well as a reduction in the number of transaction interfaces that must be developed and maintained for each different type of card-on-file data.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system comprising:
a network interface that sends and receives information;
a processor and memory that execute instructions causing the system to:
  receive a plurality of consumer personal account numbers via the network interface, receiving the plurality of consumer personal account numbers from other than one or more consumers associated with the plurality of consumer personal account numbers;
  obtain tokenized card numbers corresponding to each of the consumer personal account numbers;
  create guest wallet accounts on behalf of each of the one or more consumers, whereby a single application program interface (API) can be used by the merchant to process transactions initiated by the one or more consumers;
  update the guest wallet accounts to include the tokenized card numbers;
  build payloads including the tokenized card numbers;
  send the payloads to a merchant for use by the merchant in replacing stored consumer personal account information with corresponding data from the payloads;
  receive one or more registrations initiated by the one or more consumers for one or more new wallet accounts; and
  combine the guest wallet accounts created on behalf of the one or more consumers with the corresponding one or more new wallet accounts.

2. The system of claim 1, wherein the instructions further cause the processor and memory to assign a CallID to each of the guest wallet accounts created on behalf of the one or more consumers, the CallID binding the tokenized card number to the merchant.

3. The system of claim 1, wherein receiving the plurality of consumer personal account numbers via the network interface includes receiving the plurality of consumer personal account numbers from a merchant that stores the consumer personal account numbers.

4. The system of claim 1, wherein the executed instructions cause the system to receive via the network interface the plurality of consumer personal account numbers from one or more issuers associated with the plurality of consumer personal account numbers.

5. The system of claim 1, wherein the payloads further include CallIDs associated with each of the quest wallet accounts, the CallIDs binding the one or more consumers and the merchant and serves as future identifiers for data sent by the merchant corresponding to consumer activity at the merchant.

6. The system of claim 1, wherein the system creates the guest wallet accounts on behalf of the one or more consumers absent any action by the one or more consumers.

7. The system of claim 1, wherein obtaining the tokenized card numbers comprises
   requesting the tokenized card numbers from a token service; and
   receiving the tokenized card numbers from the token service.

8. The system of claim 1, wherein the merchant can use the single API to process transactions regardless of the source of the transactions.

9. The system of claim 8, wherein the source of the transactions is over-the-web.

10. A processor-implemented method comprising:
    receiving, via an API exposed by a wallet platform, one or more requests from other than one or more consumers to create guest wallet accounts on behalf of the one or more consumers, the one or more requests including personal account numbers (PANs) of the one or more consumers;
    obtaining, at the wallet platform from a token service, tokenized card numbers corresponding to the personal account numbers;
    creating the guest wallet accounts on behalf of the one or more consumers whereby a common application program interface (API) can be used by a merchant to process transactions initiated by the one or more consumers;
    sending to the merchant associated with the one or more consumers, via an API call of the wallet platform, one or more payloads containing guest wallet account information corresponding to the guest wallet accounts created on behalf of the one or more consumers;
    receiving at the wallet platform registration requests from the one or more consumers to create new wallet accounts;
    creating the new wallet accounts for each of the one or more consumers in response to the registration requests; and
    incorporating the guest wallet accounts created on behalf of the one or more consumers into the corresponding new wallet account for the one or more consumers.

11. The method of claim 10, further comprising:
    receiving a request from the one or more consumers for a status of the one or more consumers' guest wallet accounts; and
    providing information corresponding to the guest wallet accounts according to a channel through which the request is received.

12. The method of claim 11, wherein providing information corresponding to the guest wallet accounts according to the channel through which the request is received comprises returning information about a guest wallet account associated with the merchant for a request received through the merchant.

13. The method of claim 11, wherein providing information corresponding to the guest wallet account according to the channel through which the request is received comprises returning information about for all guest wallet accounts for the one or more consumers associated with merchants holding tokens for PANs from an issuer for requests received through the issuer.

14. The method of claim 11, wherein providing information corresponding to the guest wallet account according to the channel through which the request is received comprises returning information for PANs from all issuers associated with any merchant for requests received via the wallet platform.

15. The method of claim 10, wherein the merchant can use the common API to process transactions regardless of the source of the transactions.

16. The method of claim 15, wherein the source of the transactions is over-the-web.

17. A non-transitory computer-readable medium storing instructions that cause one or more processors to:
    receive a plurality of consumer personal account numbers via a network interface, receiving the plurality of consumer personal account numbers from other than one or more consumers associated with the plurality of consumer personal account numbers;
    obtain tokenized card numbers corresponding to each of the consumer personal account numbers;
    create guest wallet accounts on behalf of each of the one or more consumers, whereby a single application program interface (API) can be used by a merchant to process transactions initiated by the one or more consumers;
    update the guest wallet accounts to include the tokenized card numbers;
    build payloads including the tokenized card numbers;
    send the payloads to a merchant for use by the merchant in replacing stored consumer personal account information with corresponding data from the payloads;
    receive one or more registrations initiated by the one or more consumers for one or more new wallet accounts; and
    combine the guest wallet accounts created on behalf of the one or more consumers with the corresponding one or more new wallet accounts.

* * * * *